United States Patent
Raghavan et al.

(10) Patent No.: US 11,849,434 B2
(45) Date of Patent: Dec. 19, 2023

(54) PREEMPTING, OVERWRITING, OR CANCELING SYMBOLS IN A SLOT FORMAT INDICATOR ALLOCATION

(71) Applicant: QUALCOMM Incorporated, San Diego, CA (US)

(72) Inventors: Vasanthan Raghavan, West Windsor Township, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 17/249,854

(22) Filed: Mar. 16, 2021

(65) Prior Publication Data

US 2021/0298013 A1    Sep. 23, 2021

Related U.S. Application Data

(60) Provisional application No. 62/991,453, filed on Mar. 18, 2020, provisional application No. 62/991,454, filed on Mar. 18, 2020.

(51) Int. Cl.
*H04W 72/04* (2023.01)
*H04W 72/0446* (2023.01)
*H04W 72/21* (2023.01)
*H04W 72/56* (2023.01)

(52) U.S. Cl.
CPC ....... *H04W 72/0446* (2013.01); *H04W 72/21* (2023.01); *H04W 72/56* (2023.01)

(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| | | | |
|---|---|---|---|
| 11,212,821 B2 * | 12/2021 | Jung | H04L 5/0064 |
| 2017/0238301 A1 * | 8/2017 | Nakazawa | H04L 5/0007 370/329 |
| 2019/0268127 A1 | 8/2019 | Hosseini et al. | |

FOREIGN PATENT DOCUMENTS

| | | |
|---|---|---|
| EP | 2037608 A1 | 3/2009 |
| EP | 3713307 A1 | 9/2020 |
| WO | 2019098059 A1 | 5/2019 |

OTHER PUBLICATIONS

International Search Report and Written Opinion—PCT/US2021/070277—ISA/EPO—dated Jun. 29, 2021.

* cited by examiner

*Primary Examiner* — Bo Hui A Zhu
(74) *Attorney, Agent, or Firm* — Harrity & Harrity, LLP

(57) ABSTRACT

Various aspects of the present disclosure generally relate to wireless communication. In some aspects, a user equipment may generate a request to overwrite or cancel a communication mode of a symbol in a slot of a communication with a base station based at least in part on interference in communications with the base station on one or more frequency bands used for carrier aggregation and transmit the request to the base station. Numerous other aspects are provided.

30 Claims, 13 Drawing Sheets

| Symbol # | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| Communication mode | D | D | D | D | D | D | D | D | D | D | D | U | U | U |

400

500

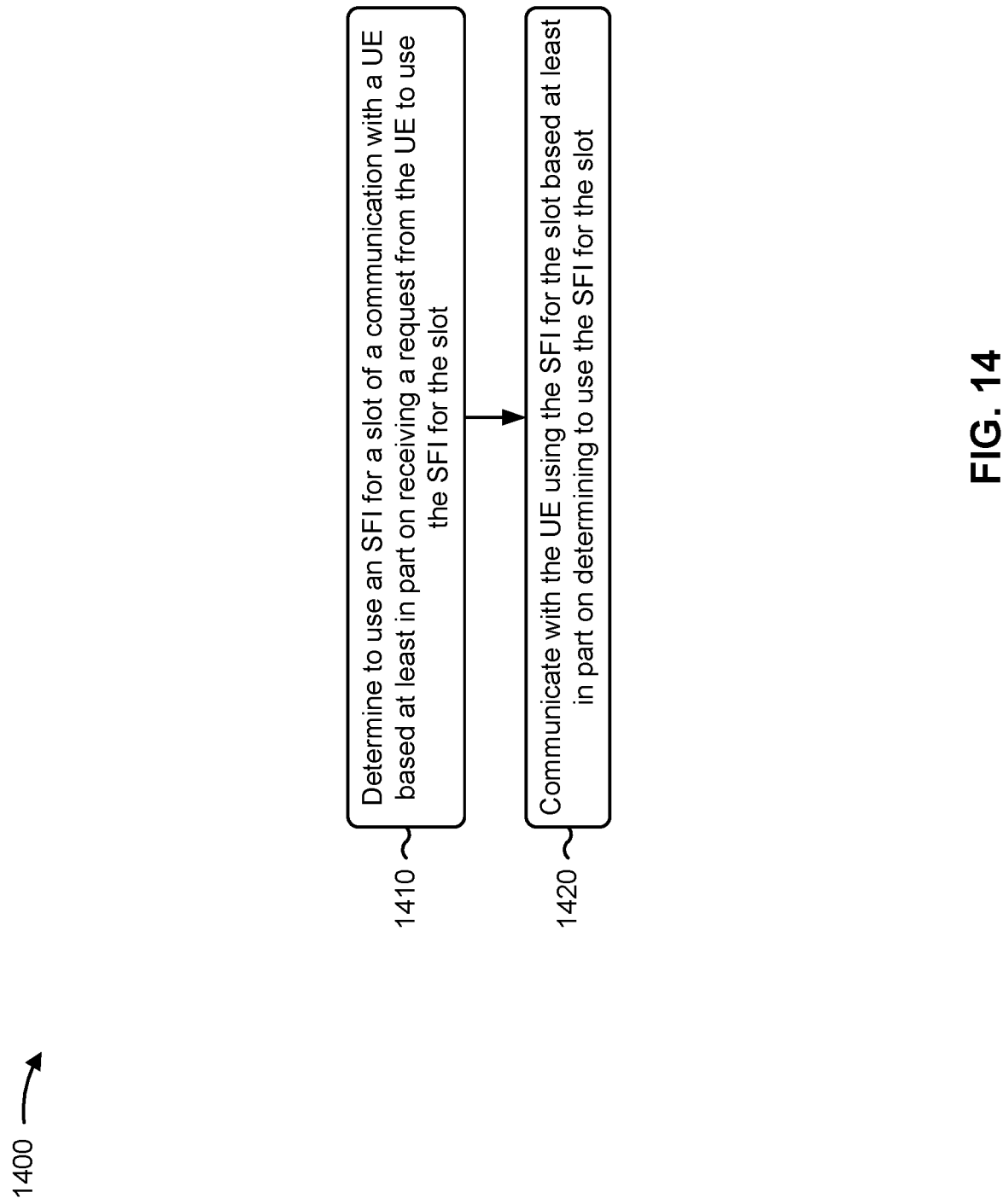

PREEMPTING, OVERWRITING, OR CANCELING SYMBOLS IN A SLOT FORMAT INDICATOR ALLOCATION

CROSS-REFERENCE TO RELATED APPLICATIONS

This patent application claims priority to U.S. Provisional Patent Application No. 62/991,453, filed on Mar. 18, 2020, and entitled "OVERWRITING OR CANCELING SYMBOLS IN A SLOT FORMAT INDICATOR ALLOCATION," and U.S. Provisional Patent Application No. 62/991,454, filed on Mar. 18, 2020, and entitled "PREEMPTION OF SYMBOLS IN A SLOT FORMAT INDICATOR ALLOCATION." The disclosure of the prior Applications are considered part of and are incorporated by reference into this patent application.

FIELD OF THE DISCLOSURE

Aspects of the present disclosure generally relate to wireless communication and to techniques and apparatuses for preempting, overwriting, or canceling symbols in a slot format indicator allocation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include generating a request to overwrite or cancel a communication mode of a symbol in a slot of a communication with a base station based at least in part on interference in communications with the base station on one or more frequency bands used for carrier aggregation. The method may include transmitting the request to the base station. In some aspects, the method may include generating a request to overwrite or cancel a communication mode of a set of symbol, where the set of symbols may include one or more symbols.

In some aspects, a method of wireless communication, performed by a base station, may include determining to overwrite or cancel a communication mode of a symbol in a slot of a communication with a UE based at least in part on receiving a request from the UE to overwrite or cancel the communication mode of the symbol. The method may include communicating with the UE using another communication mode for the symbol in the slot based at least in part on determining to overwrite or cancel the communication mode of the symbol.

In some aspects, a UE for wireless communication may include a memory and one or more processors operatively coupled to the memory. The memory and the one or more processors may be configured to generate a request to overwrite or cancel a communication mode of a symbol in a slot of a communication with a base station, based at least in part on interference in communications with the base station on one or more frequency bands used for carrier aggregation, and transmit the request to the base station. The carrier aggregation may be contiguous or non-contiguous, intra-band or inter-band.

In some aspects, a base station for wireless communication may include a memory and one or more processors operatively coupled to the memory. The memory and the one or more processors may be configured to determine to overwrite or cancel a communication mode of a symbol in a slot of a communication with a UE based at least in part on receiving a request from the UE to overwrite or cancel the communication mode of the symbol, and communicate with the UE using another communication mode for the symbol in the slot based at least in part on determining to overwrite or cancel the communication mode of the symbol.

In some aspects, a non-transitory computer-readable medium may store one or more instructions for wireless communication. The one or more instructions, when executed by one or more processors of a UE, may cause the one or more processors to generate a request to overwrite or cancel a communication mode of a symbol in a slot of a communication with a base station, based at least in part on interference in communications with the base station on one or more frequency bands used for carrier aggregation, and transmit the request to the base station.

In some aspects, a non-transitory computer-readable medium may store one or more instructions for wireless communication. The one or more instructions, when executed by one or more processors of a base station, may cause the one or more processors to determine to overwrite or cancel a communication mode of a symbol in a slot of a communication with a UE, based at least in part on receiving a request from the UE to overwrite or cancel the communication mode of the symbol, and communicate with the UE using another communication mode for the symbol in the slot based at least in part on determining to overwrite or cancel the communication mode of the symbol.

In some aspects, an apparatus for wireless communication may include means for generating a request to overwrite or cancel a communication mode of a symbol in a slot of a communication with a base station based at least in part on interference in communications with the base station on one or more frequency bands used for carrier aggregation, and means for transmitting the request to the base station.

In some aspects, an apparatus for wireless communication may include means for determining to overwrite or cancel a communication mode of a symbol in a slot of a communication with a UE based at least in part on receiving a request from the UE to overwrite or cancel the communication mode of the symbol, and means for communicating with the UE using another communication mode for the symbol in the slot based at least in part on determining to overwrite or cancel the communication mode of the symbol.

In some aspects, a method of wireless communication, performed by a user equipment, may include generating a request for a slot format indicator (SFI) for a slot of a communication with a base station based at least in part on interference in communications with the base station on one or more frequency bands used for carrier aggregation. The method may include transmitting the request to the base station.

In some aspects, a method of wireless communication, performed by a base station, may include determining to use an SFI for a slot of a communication with a UE based at least in part on receiving a request from the UE to use the SFI for the slot. The method may include communicating with the UE using the SFI for the slot based at least in part on determining to use the SFI for the slot.

In some aspects, a UE for wireless communication may include a memory and one or more processors operatively coupled to the memory. The memory and the one or more processors may be configured to generate a request for an SFI for a slot of a communication with a base station based at least in part on interference in communications with the base station on one or more frequency bands used for carrier aggregation, and transmit the request to the base station.

In some aspects, a base station for wireless communication may include a memory and one or more processors operatively coupled to the memory. The memory and the one or more processors may be configured to determine to use an SFI for a slot of a communication with a UE based at least in part on receiving a request from the UE to use the SFI for the slot, and communicate with the UE using the SFI for the slot based at least in part on determining to use the SFI for the slot.

In some aspects, a non-transitory computer-readable medium may store one or more instructions for wireless communication. The one or more instructions, when executed by one or more processors of a UE, may cause the one or more processors to generate a request for an SFI for a slot of a communication with a base station based at least in part on interference in communications with the base station on one or more frequency bands used for carrier aggregation, and transmit the request to the base station.

In some aspects, a non-transitory computer-readable medium may store one or more instructions for wireless communication. The one or more instructions, when executed by one or more processors of a base station, may cause the one or more processors to determine to use an SFI for a slot of a communication with a UE based at least in part on receiving a request from the UE to use the SFI for the slot, and communicate with the UE using the SFI for the slot based at least in part on determining to use the SFI for the slot.

In some aspects, an apparatus for wireless communication may include means for generating a request for an SFI for a slot of a communication with a base station based at least in part on interference in communications with the base station on one or more frequency bands used for carrier aggregation, and means for transmitting the request to the base station.

In some aspects, an apparatus for wireless communication may include means for determining to use an SFI for a slot of a communication with a UE based at least in part on receiving a request from the UE to use the SFI for the slot, and means for communicating with the UE using the SFI for the slot based at least in part on determining to use the SFI for the slot.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 14 is a diagram illustrating an example process performed, for example, by a base station, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
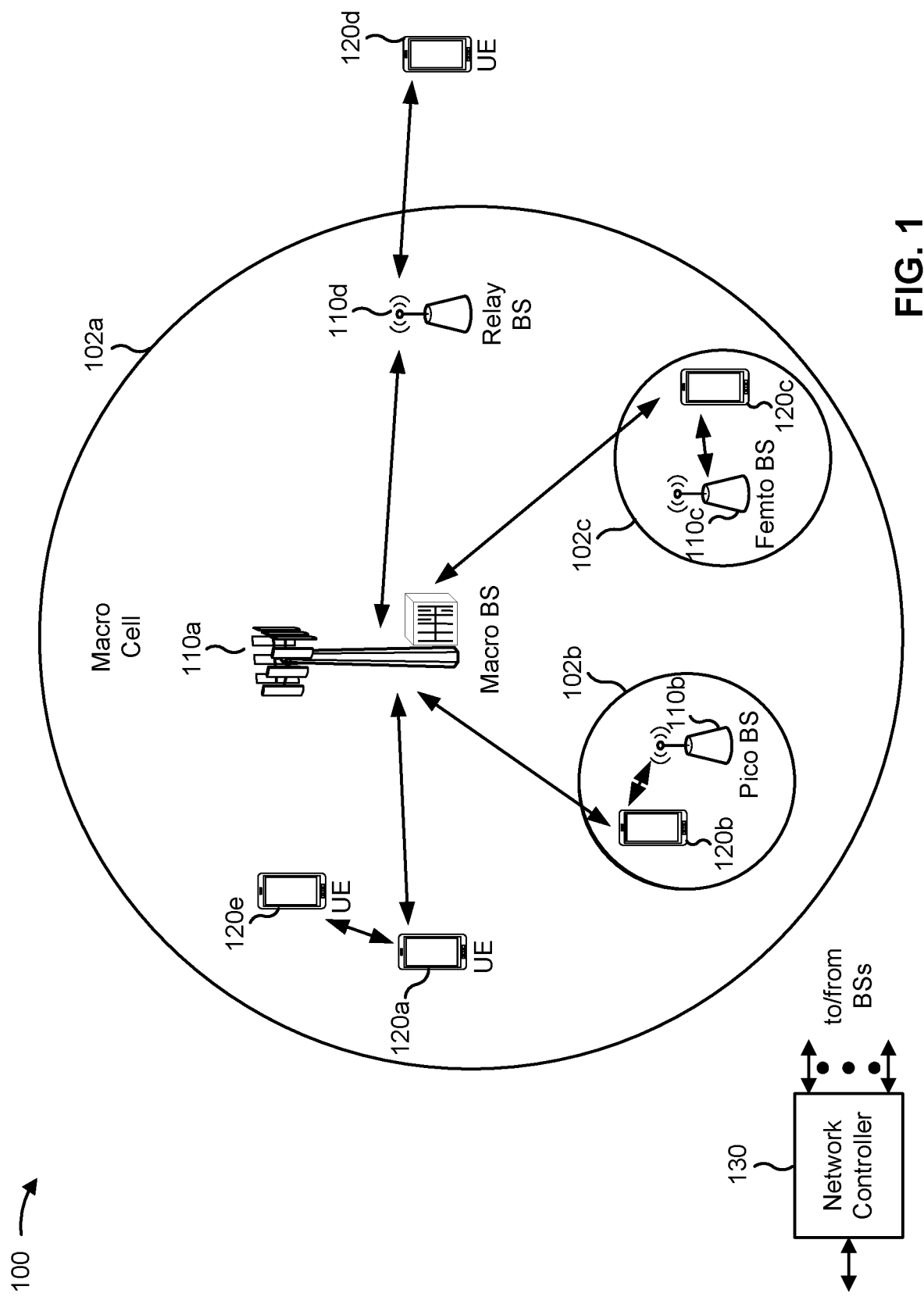
FIG. 1 is a block diagram illustrating an example of a wireless communication network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
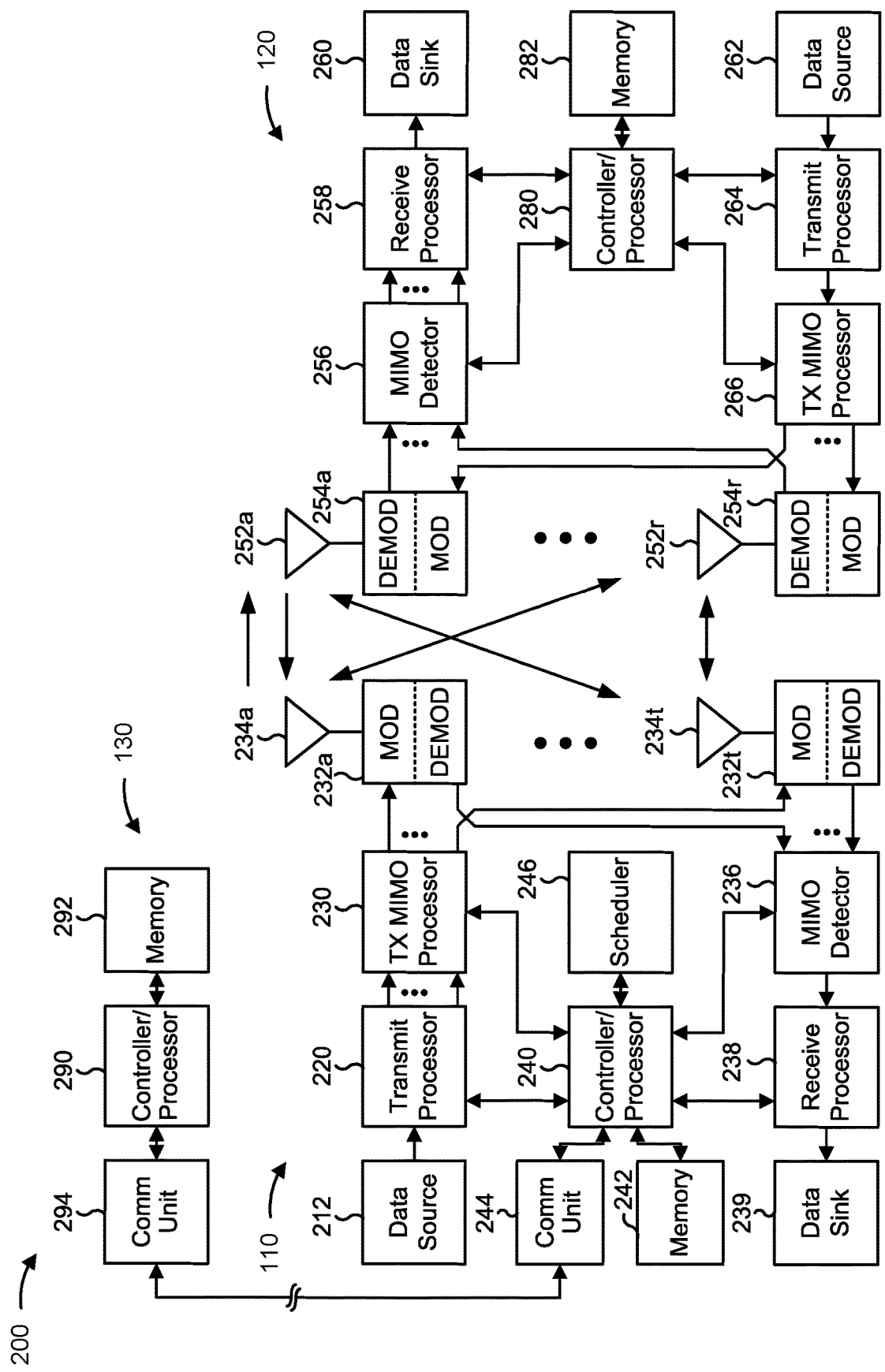
FIG. 2 is a block diagram illustrating an example of a base station in communication with a user equipment (UE) in a wireless communication network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of UE 120. In some aspects, UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to 1-14.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of base station 110 may be included in a modem of the base station 110. In some aspects, base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-14.

Controller/processor 240 of base station 110, controller/processor 280 of UE 120, and/or any other component(s) of FIG. 2 may perform one or more techniques associated with preempting, overwriting, or canceling symbols in a slot format indicator (SFI) allocation, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 900 of FIG. 9, process 1000 of FIG. 10, process 1300 of FIG. 13, process 1400 of FIG. 14, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 may include means for generating a request to overwrite or cancel a communication mode of a symbol in a slot of a communication with a base station based at least in part on interference in communications with the base station on one or more frequency bands used for carrier aggregation (CA), means for transmitting the request to the base station, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for determining to overwrite or cancel a communication mode of a symbol in a slot of a communication with a UE based at least in part on receiving a request from the UE to overwrite or cancel the communication mode of the symbol, means for communicating with the UE using another communication mode for the symbol in the slot based at least in part on determining to overwrite or cancel the communication mode of the symbol, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

In some aspects, UE 120 may include means for generating a request for an SFI for a slot of a communication with a base station based at least in part on interference in communications with the base station on one or more frequency bands used for CA, means for transmitting the request to the base station, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for determining to use an SFI for a slot of a communication with a UE based at least in part on receiving a request from the UE to use the SFI for the slot, means for communicating with the UE using the SFI for the slot based at least in part on determining to use the SFI for the slot. and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

As indicated above, FIG. 2 is provided as an example. Other examples may differ from what is described with regard to FIG. 2.

Figure 3:
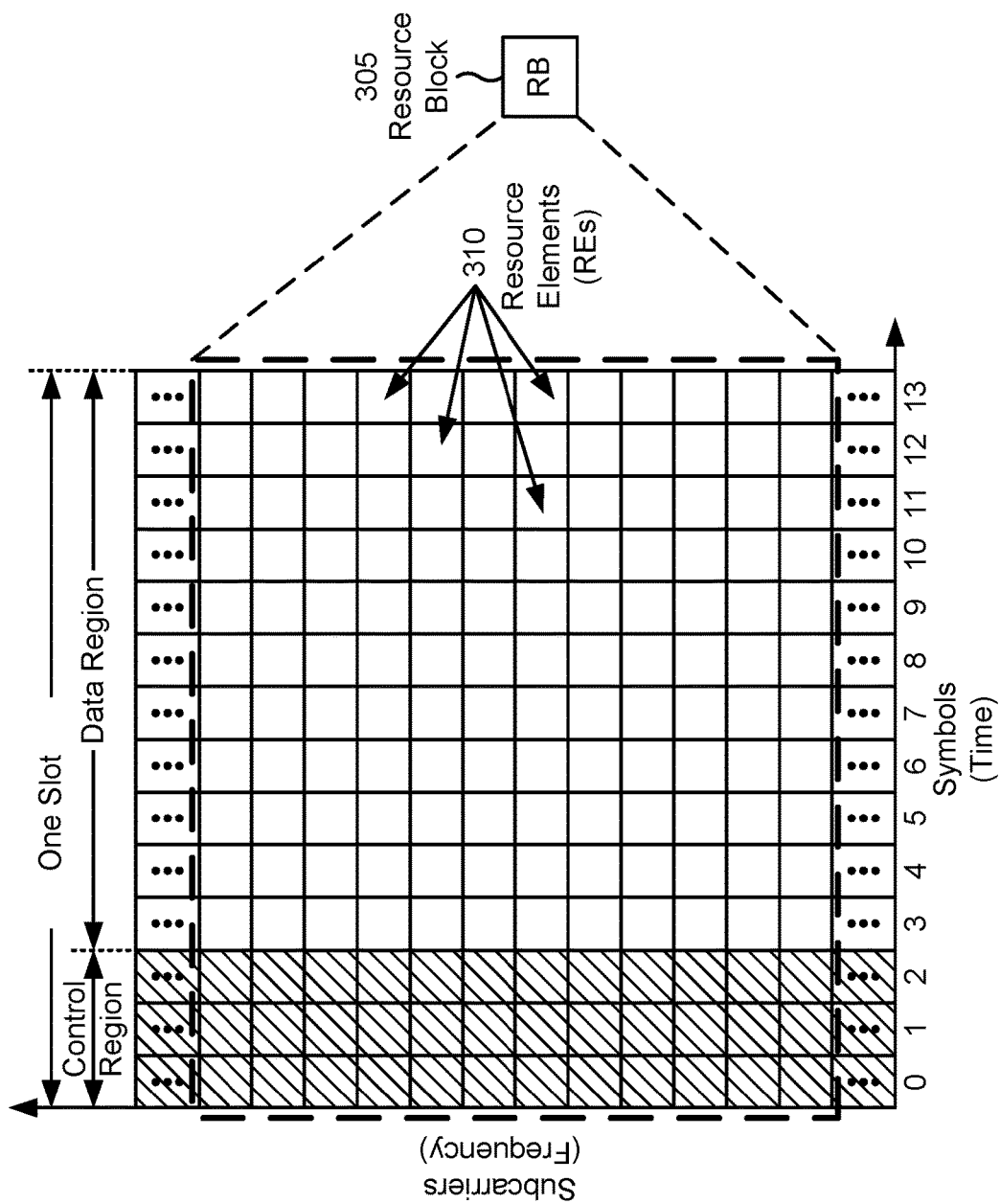
FIG. 3 is a diagram illustrating an example of a slot format, in accordance with the present disclosure.

FIG. 3 is a diagram illustrating an example 300 of a slot format, in accordance with the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an OFDM symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format). A slot may be configured with a link direction (e.g., downlink or uplink) for transmission. In some aspects, the link direction for a slot may be dynamically configured.

As indicated above, FIG. 3 is provided as an example. Other examples may differ from what is described with respect to FIG. 3.

Figures 4, 5:
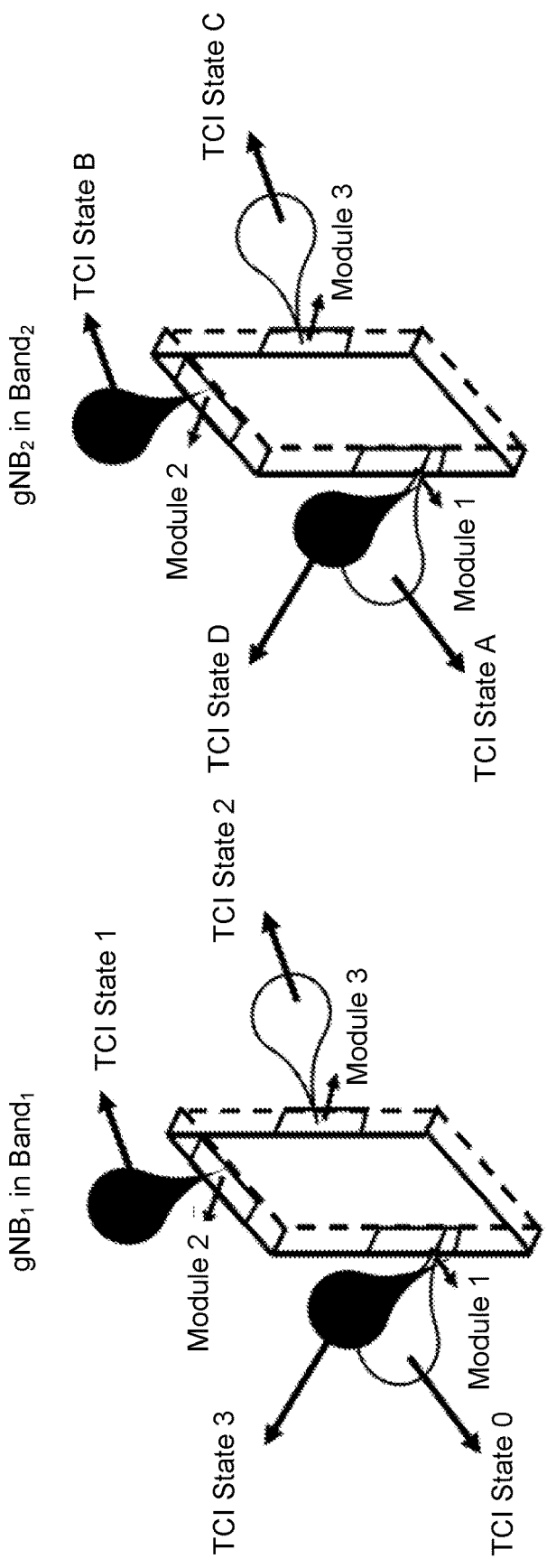
FIG. 4 is a diagram illustrating an example of a slot format with communication modes, in accordance with the present disclosure.
FIG. 5 illustrates an example of two base station antenna panels, in accordance with the present disclosure.

FIG. 4 is a diagram illustrating an example 400 of a slot format with communication modes, in accordance with the present disclosure.

A UE configured for time division duplexing (TDD) may transmit or receive a communication at each symbol of a time slot. Each symbol of the slot may have a communication mode, which may be an uplink communication mode (U), a downlink communication mode (D), a gap symbol (blank), or a flexible symbol (F). For example, FIG. 4 shows a slot with a D for a first 10 symbols and a U for a last 4 symbols. A combination of communication modes for a slot may have a slot format indicator (SFI). FIG. 4 shows an SFI of 32 with F symbols 9 and 10 being U. By contrast, an SFI for all Ds may be 0, and an SFI for all Us may be 1.

Dynamic TDD is a flexible transmission technology in NR. In LTE, a slot format is usually the same for all UEs within the cell. NR, by contrast, provides maximum flexibility in terms of subframe structure, where different UEs can have different slot formats. That is, they can have different permutations of either D, U or F symbols in a slot, depending on instantaneous traffic load. For example, one UE may have 10 Ds and 4 Us in a slot, while another UE may have 6 Ds and 8 Us in the same slot. As a result, some UEs transmitting uplink communications can interfere with other UEs receiving downlink communications at the same time. This interference may be referred to as cross-link interference (CLI).

As indicated above, FIG. 4 is provided as an example. Other examples may differ from what is described with respect to FIG. 4.

Figure 6:
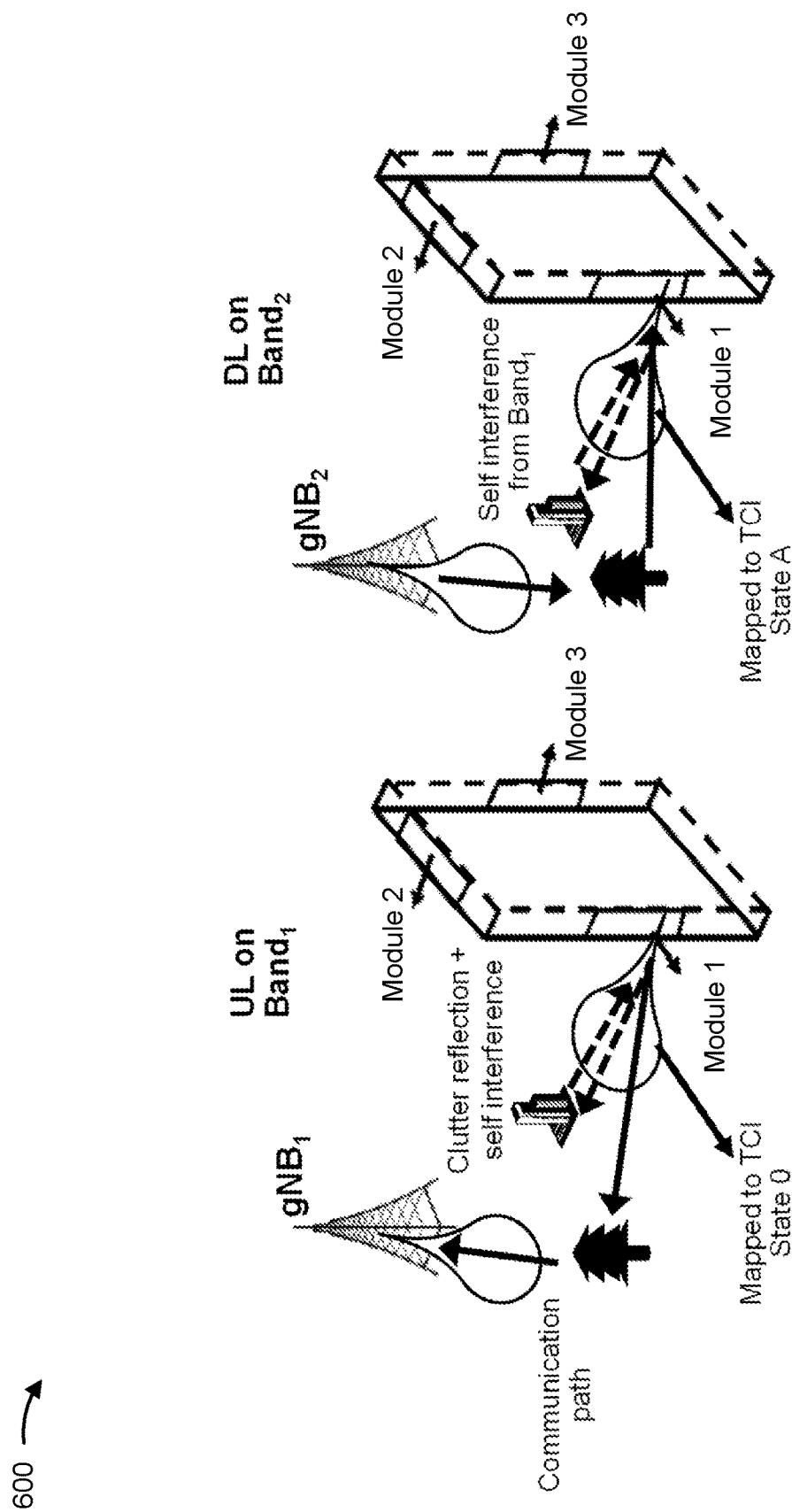
FIG. 6 illustrates an example of a UE experiencing interference, in accordance with the present disclosure.

There is a tradeoff between flexible slot formats and increased interference. To help illustrate this interference, FIGS. 5 and 6 show transmission beams for two base stations (e.g., gNBs) and a UE.

FIG. 5 illustrates an example 500 of two base stations, in accordance with the present disclosure.

A first antenna panel of the UE for a first frequency band (Band$_1$) may have a first module, a second module, and a third module for transmitting and/or receiving communications on beams. The first module may establish a link with a first base station (gNB$_1$) with a beam that is associated with a first transmission configuration indicator (TCI) state 0 and a link with a second beam associated with a second TCI state 3. The second and third modules may also establish a link with gNB$_1$ with beams associated with TCI states 1 and 2, respectively. A second antenna panel of the UE for a second frequency band (Band$_2$) may also have a first module, a second module, and a third module for transmitting and/or receiving communications on beams. The first module may establish a link with gNB$_2$ with a beam associated with a first TCI state A and a second TCI state D. The second and third modules may also establish the link with beams associated with TCI states B and C, respectively.

The first and second base stations (gNB$_1$ and gNB$_2$) may be co-located or non-co-located. If gNB$_1$ and gNB$_2$ are co-located, or if they are non-co-located (but see a similar local environment that is typically the case in a small cell scenario), and if Band₁ and Band₂ are in millimeter wave (mmWave) bands, such as in FR2 or frequency range 4 (FR4), then the TCI states may be correlated. That is, TCI state 0 may be comparable with TCI state A, TCI state 1 may be comparable with TCI state B, and so forth. That is, the steering angle of energy for TCI state A and TCI state 1 may be closely related, comparable, or correlated. Interference that affects these beams will be explained in connection with FIG. 6.

As indicated above, FIG. 5 is provided as an example. Other examples may differ from what is described with respect to FIG. 5.

FIG. 6 illustrates an example 600 of a UE experiencing interference, in accordance with the present disclosure. FIG. 6 shows an antenna (spatial filter) configuration for a UE for uplink communications on Band₁ and a configuration for the UE for downlink communications on Band₂.

As shown in FIG. 6, a module of the UE may be mapped to a beam from gNB₁ that is identified by TCI state 0 for transmitting an uplink transmission. The module may also be mapped to a beam from gNB₂ that is identified by TCI state A for receiving a downlink transmission. For high data rate cases of contiguous or non-contiguous intra-band and inter-band CA, different SFIs may be used in different frequency bands.

While the UE may experience some CLI caused by communications from other UEs, the UE may also experience some signal "clutter" from other objects (e.g., buildings) and therefore experience self-interference in some symbols with uplink communications. For example, if TCI state 0 and TCI state A are dominant clusters in Band₁ and Band₂ (due to beam correlation), there may be self-interference issues due to clutter in these channels in symbols where UL and DL mode operations are mismatched. That is, if an SFI for Band₁ is set to UL and an SFI for Band₂ is set to DL on some symbols of configured SFIs across Band₁ and Band₂, clutter in the environment may cause self-interference from Band₁ and Band₂ due to similar signal directions. While clutter requires the presence of reflective or diffractive or scattering objects in the environment that "re-transmits" energy back to the receiver from the transmitter, it is not always necessary if those objects are absent. Thus, system design for good quality-of-service has to encompass the possibility of clutter without optimistically ignoring their presence.

As indicated above, FIG. 6 is provided as an example. Other examples may differ from what is described with respect to FIG. 6.

As explained in connection with FIGS. 5 and 6, a UE may experience interference for certain symbols in a slot. This interference may cause a degradation of communications between the UE and the gNBs. While the gNB may select slot formats for UEs, the gNB may not select a best slot format to mitigate the degradation.

According to various aspects described herein, the UE may request that a communication mode of a symbol in a slot be overwritten or canceled. For example, the UE may determine that a communication mode of a symbol in a slot should be overwritten, or changed, from a U to a D due to interference by another UE or due to self-interference at the D symbol caused by the U symbol. The UE may request that the communication mode be overwritten, and the gNB may grant the request. As a result of the request by the UE, a communication may be more successful at the symbol and may not be degraded by interference. The UE may also request that the communication mode be canceled (e.g., via a cancelation indication (CI)), so as to eliminate a chance that a communication is lost at the D symbol due to interference from another UE or the U symbol of the same UE. The UE may signal a (CI) informing one or more gNBs where the UE uses a gap symbol instead of allocated U/D symbols in one or more of frequency bands. In some aspects, the UE may request that a communication mode for a set of symbols may be overwritten or canceled, where the set of symbols may include one or more symbols.

Figure 7:
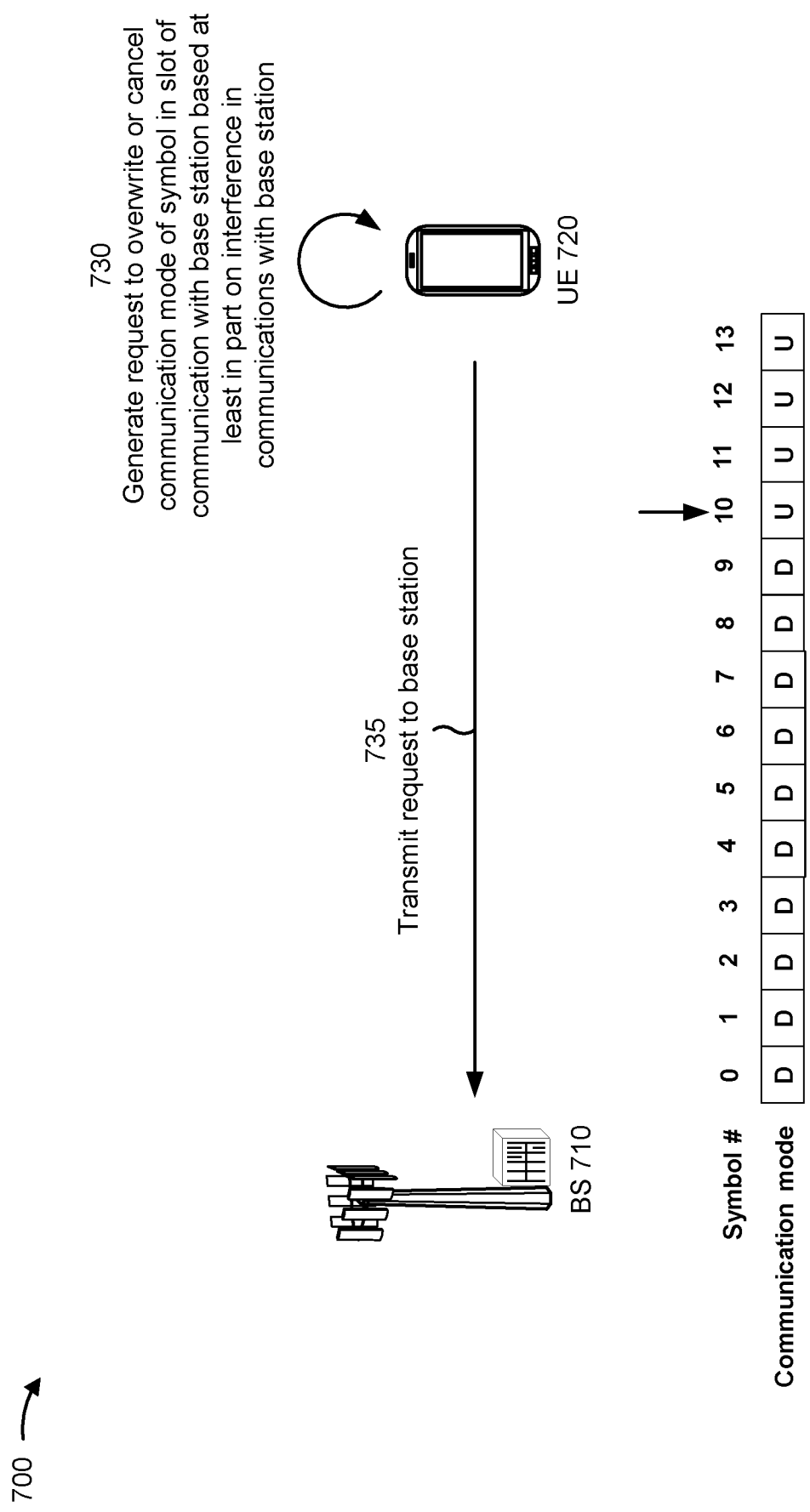
FIGS. 7 and 8 are diagrams illustrating an example of overwriting or canceling symbols in a slot format indicator allocation, in accordance with the present disclosure.

FIG. 7 is a diagram illustrating an example 700 of overwriting or canceling symbols in an SFI allocation, in accordance with the present disclosure. FIG. 7 shows a base station (BS) 710 (e.g. a BS 110 depicted in FIGS. 1 and 2, a gNB depicted in FIGS. 5 and 6) and a UE 720 (e.g., a UE 120 depicted in FIGS. 1 and 2, the UE depicted in FIG. 6) that may communicate with one another.

As show by reference number 730, UE 720 may generate a request to overwrite or cancel a communication mode of a symbol in a slot of a communication with BS 710. UE 720 may generate the request based at least in part on interference in communications with BS 710. The interference may be due to movement of UE 720 and associated Doppler fading, clutter in the channel environment, beam blockage, or a combination thereof. In some aspects, the request is for BS 710 to overwrite a D with a U in the symbol, overwrite a U with a D in the symbol, or cancel the symbol (either an UL or a DL allocation) to make the symbol a gap symbol or an F symbol. For example, FIG. 7 shows a U at symbol 10, and UE 720 may request that the U at symbol 10 be overwritten with a D. In some aspects, the request may be for BS 710 to prioritize a D over a U for the symbol, or to prioritize a U over a D for the symbol. In some aspects, the request is specific to one or more frequency bands.

As shown by reference number 735, UE 720 may transmit the request to BS 710. The request may be dynamically altered based at least in part on changes in channel conditions (e.g., movement of UE 720, clutter, clusters, blockage). For example, UE 720 may transmit the request in uplink control information (UCI) on a physical uplink control channel (PUCCH) or a physical uplink shared channel (PUSCH) for the slot. In some aspects, UE 720 may jointly indicate an overwrite or cancelation with a CI. In some aspects, the request may be semi-static, or may correspond to a specific set of symbols in a plurality of slots. For example, the request may apply to the tenth symbol in each of a quantity of consecutive slots.

As indicated above, FIG. 7 is provided as an example. Other examples may differ from what is described with respect to FIG. 7.

Figure 8:
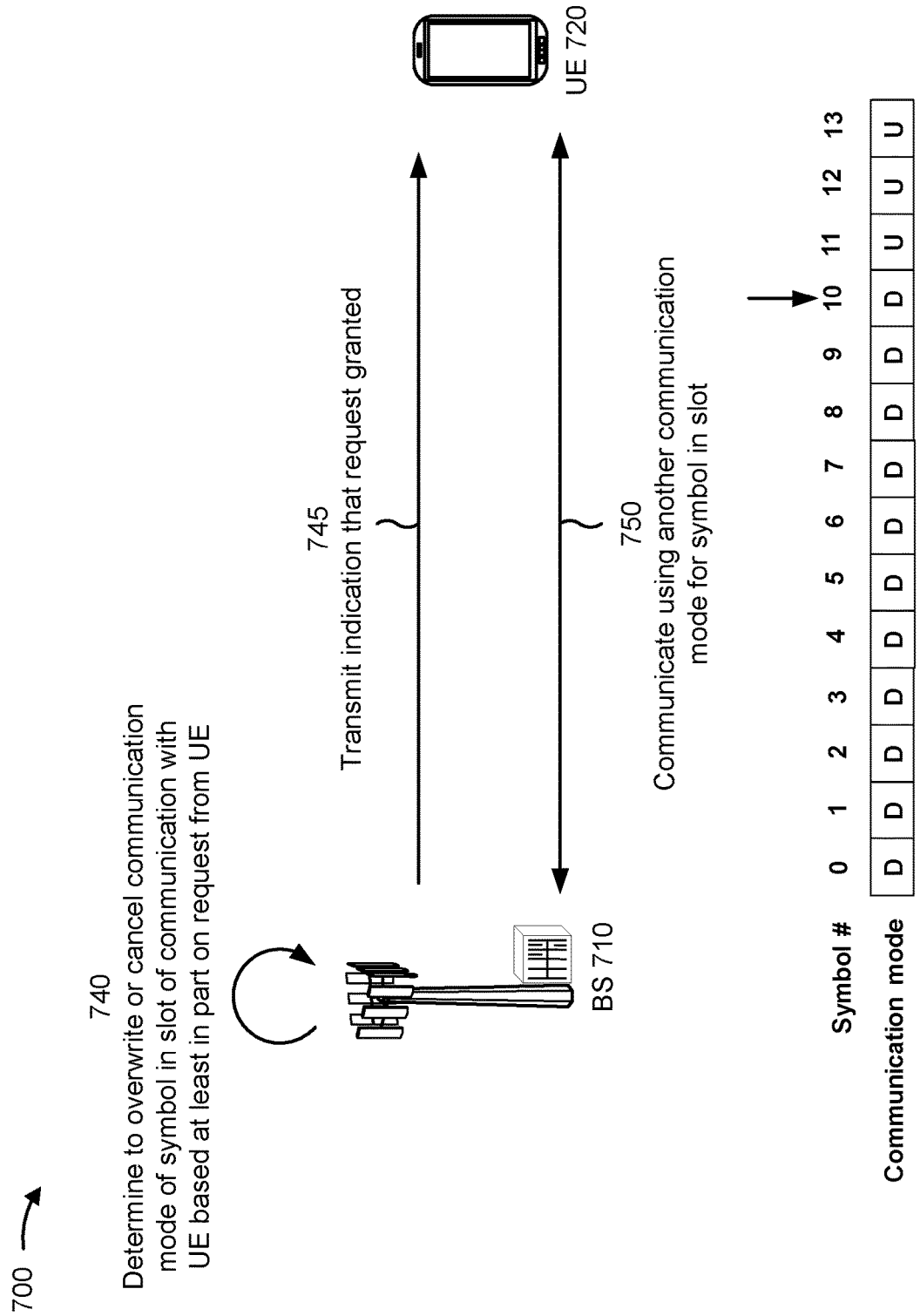

FIG. 8 is a diagram illustrating a continuation of example 700, in accordance with the present disclosure.

As show by reference number 740, BS 710 may determine to overwrite or cancel the communication mode of the symbol in the slot of the communication based at least in part on the request from UE 720. BS 710 may grant the request from UE 720 based at least in part on information about the interference, such as measurements of communications at the symbol or information about failed communications or increased bit or block error rates observed. BS 710 may also consider movement of UE 720, clutter in the channel environment, beam blockage, or a combination thereof. BS 710 may further consider information about other UEs affecting communications with UE 720 and/or information from other base stations.

As shown by reference number 745, BS 710 may transmit an indication to UE 720 that the request is granted. The indication may be in downlink control information (DCI) or a medium access channel control element (MAC-CE). The indication may apply to multiple slots and/or may be in a radio resource control (RRC) message. Alternatively, BS 710 may transmit an indication that the request is not granted.

As shown in FIG. 8 and by reference number 750, UE 720 may overwrite the U at symbol 10 with a D. UE 720 may thus receive a downlink communication at symbol 10 rather than transmit an uplink communication. As a result, communications at symbol 10 for a slot or multiple slots may improve between BS 710 and UE 720.

In some aspects, BS 710 may make some adjustments based on the request. For example, BS 710 may perform rate control based at least in part on the request. BS 710 may increase or decrease a rate based at least in part on whether the request is for changing a communication mode from a D to a U, changing a U to a D, or canceling the communication mode with the use of a flexible or gap symbol. In some aspects, BS 710 may adapt a modulation and coding scheme based at least in part on the request.

As indicated above, FIG. 8 is provided as an example. Other examples may differ from what is described with respect to FIG. 8.

Figure 9:
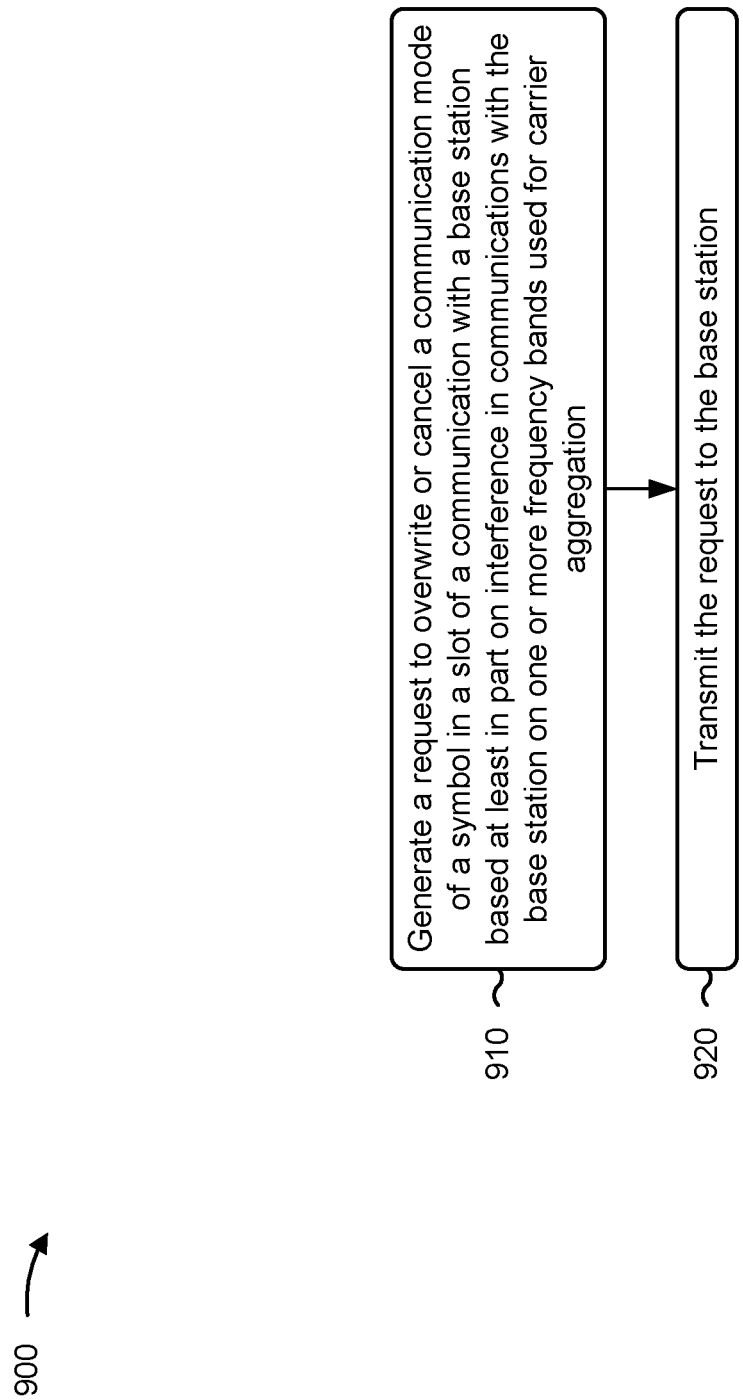
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120 depicted in FIGS. 1 and 2, the UE depicted in FIG. 6, UE 720 depicted in FIGS. 7-8) performs operations associated with overwriting or canceling symbols in an SFI allocation.

As shown in FIG. 9, in some aspects, process 900 may include generating a request to overwrite or cancel a communication mode of a symbol in a slot of a communication with a base station based at least in part on interference in communications with the base station on one or more frequency bands used for CA (block 910). For example, the UE (e.g., using receive processor 258, transmit processor 264, controller/processor 280, memory 282) may generate a request to overwrite or cancel a communication mode of a symbol in a slot of a communication with a base station based at least in part on interference in communications with the base station on one or more frequency bands used for CA, as described above.

As further shown in FIG. 9, in some aspects, process 900 may include transmitting the request to the base station (block 920). For example, the UE (e.g., using receive processor 258, transmit processor 264, controller/processor 280, memory 282) may transmit the request to the base station, as described above.

Process 900 may include additional aspects, such as any single aspect or any combination of aspects described below and/or in connection with one or more other processes described elsewhere herein.

In a first aspect, process 900 includes receiving an indication that the request was granted, and communicating with the base station using another communication mode for the symbol in the slot based at least in part on receiving the indication.

In a second aspect, alone or in combination with the first aspect, the communication mode is an uplink communication mode, and the request is to overwrite the uplink communication mode of the symbol with a downlink communication mode.

In a third aspect, alone or in combination with one or more of the first and second aspects, the request is for the base station to prioritize a downlink communication mode over an uplink communication mode for the symbol.

In a fourth aspect, alone or in combination with one or more of the first through third aspects, the communication mode is a downlink communication mode, and the request is to overwrite the downlink communication mode of the symbol with an uplink communication mode.

In a fifth aspect, alone or in combination with one or more of the first through fourth aspects, the request is for the base station to prioritize an uplink communication mode over a downlink communication mode for the symbol.

In a sixth aspect, alone or in combination with one or more of the first through fifth aspects, the request is to cancel the communication mode of the symbol such that the symbol becomes a gap symbol or a flexible symbol as used appropriately by the UE.

In a seventh aspect, alone or in combination with one or more of the first through sixth aspects, the request corresponds to the symbol in a plurality of slots.

In an eighth aspect, alone or in combination with one or more of the first through seventh aspects, the interference is based at least in part on one or more of movement of the UE associated with Doppler fading, clutter in a channel environment, beam blockage, or a combination thereof.

In a ninth aspect, alone or in combination with one or more of the first through eighth aspects, transmitting the request includes transmitting the request in uplink control information on a physical uplink channel for the slot.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
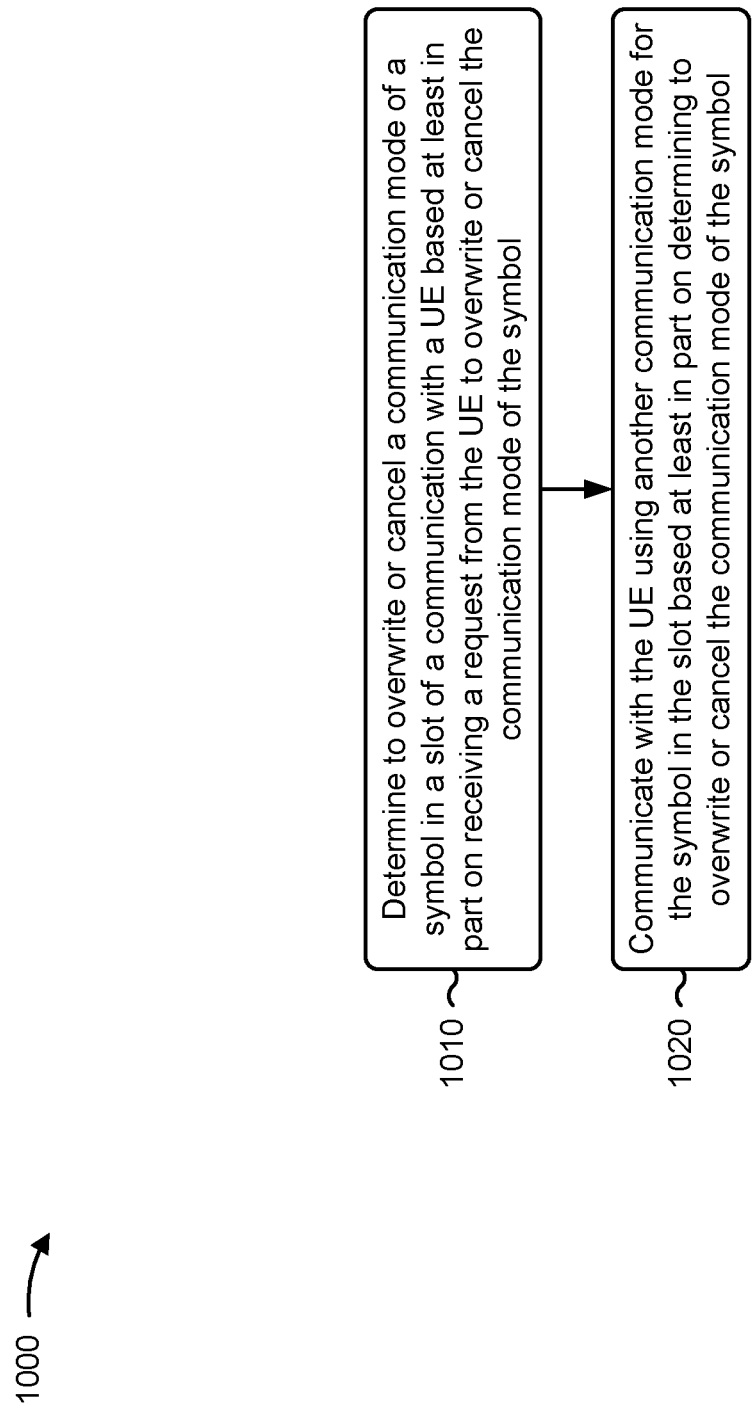
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., BS 110 depicted in FIGS. 1 and 2, a gNB depicted in FIGS. 5 and 6, BS 710 depicted in FIGS. 7-8) performs operations associated with overwriting or canceling symbols in an SFI allocation.

As shown in FIG. 10, in some aspects, process 1000 may include determining to overwrite or cancel a communication mode of a symbol in a slot of a communication with a UE based at least in part on receiving a request from the UE to overwrite or cancel the communication mode of the symbol (block 1010). For example, the base station (e.g., using transmit processor 220, receive processor 238, controller/processor 240, memory 242) may determine to overwrite or cancel a communication mode of a symbol in a slot of a communication with a UE based at least in part on receiving a request from the UE to overwrite or cancel the communication mode of the symbol, as described above.

As further shown in FIG. 10, in some aspects, process 1000 may include communicating with the UE using another communication mode for the symbol in the slot based at least in part on determining to overwrite or cancel the communication mode of the symbol (block 1020). For example, the base station (e.g., using transmit processor 220, receive processor 238, controller/processor 240, memory 242) may communicate with the UE to use another communication mode for the symbol in the slot based at least in part on determining to overwrite or cancel the communication mode of the symbol, as described above.

Process 1000 may include additional aspects, such as any single aspect or any combination of aspects described below and/or in connection with one or more other processes described elsewhere herein.

In a first aspect, process 1000 includes transmitting an indication that the request was granted to the UE.

In a second aspect, alone or in combination with the first aspect, the communication mode is an uplink communication mode, and the indication is to overwrite the uplink communication mode of the symbol with a downlink communication mode.

In a third aspect, alone or in combination with one or more of the first and second aspects, the request from the UE is for the base station to prioritize a downlink communication mode over an uplink communication mode for the symbol.

In a fourth aspect, alone or in combination with one or more of the first through third aspects, the communication mode is a downlink communication mode, and the indication is to overwrite the downlink communication mode of the symbol with an uplink communication mode.

In a fifth aspect, alone or in combination with one or more of the first through fourth aspects, the request from the UE is for the base station to prioritize an uplink communication mode over a downlink communication mode for the symbol.

In a sixth aspect, alone or in combination with one or more of the first through fifth aspects, the request is to cancel the communication mode of the symbol such that the symbol becomes a gap symbol or a flexible symbol.

In a seventh aspect, alone or in combination with one or more of the first through sixth aspects, the request corresponds to the symbol in a plurality of slots.

In an eighth aspect, alone or in combination with one or more of the first through seventh aspects, determining to overwrite or cancel the communication mode of the symbol includes determining to overwrite or cancel the communication mode of the symbol based at least in part on movement of the UE, clutter detected by the UE, beam blockage, or a combination thereof.

In a ninth aspect, alone or in combination with one or more of the first through eighth aspects, receiving the request includes receiving the request in uplink control information on a physical uplink channel for the slot.

In a tenth aspect, alone or in combination with one or more of the first through ninth aspects, process 1000 includes performing one or more of rate control or modulation and coding scheme adaptation based at least in part on the request.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
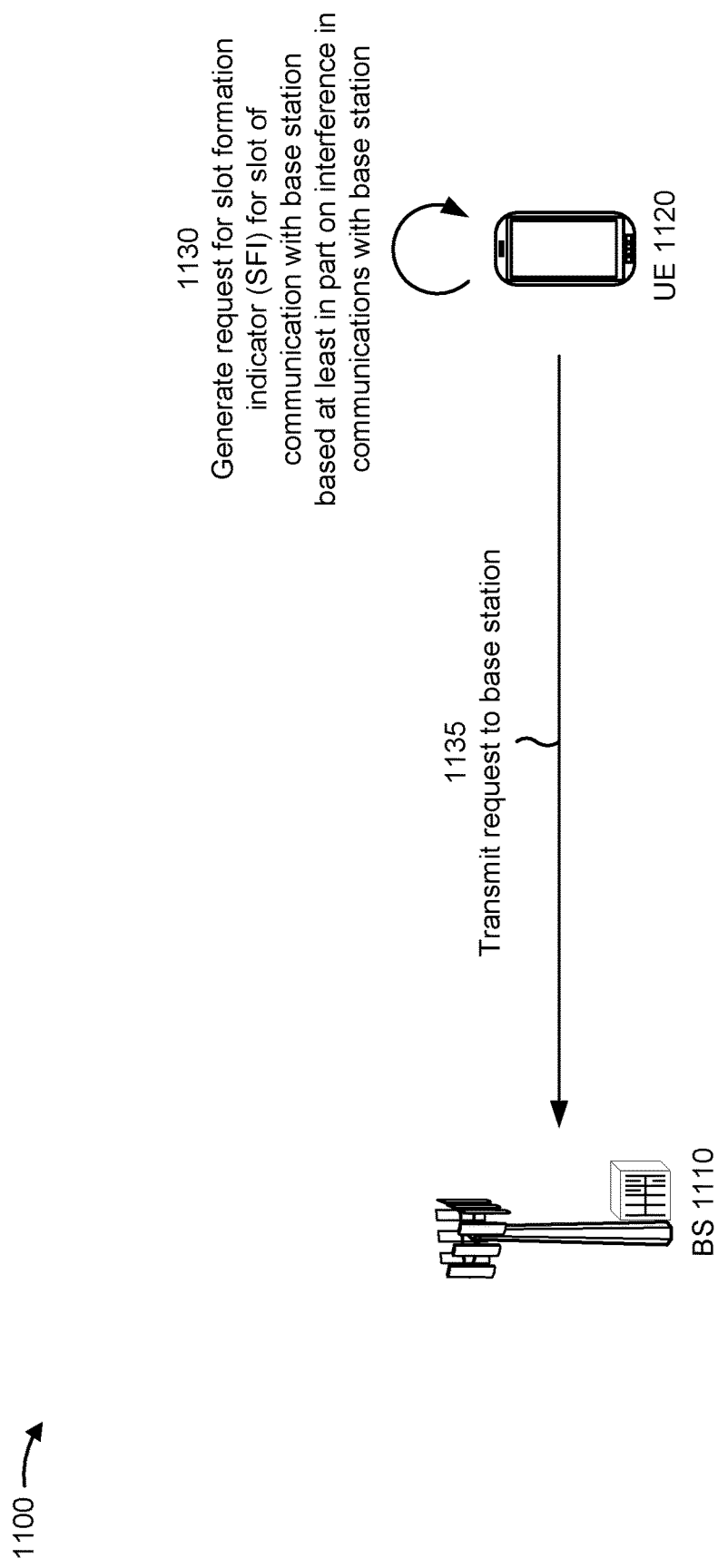
FIGS. 11 and 12 are diagrams illustrating an example of slot format indicator preemption, in accordance with the present disclosure.

FIG. 11 is a diagram illustrating an example 1100 of SLI preemption in accordance with the present disclosure. FIG. 11 shows a base station (BS) 1110 (e.g., a BS 110 depicted in FIGS. 1 and 2, a gNB depicted in FIGS. 5 and 6) and a UE 1120 (e.g., a UE 120 depicted in FIGS. 1 and 2, the UE depicted in FIG. 6) that may communicate with one another.

As show by reference number 1130, UE 1120 may generate a request for an SFI for a slot of a communication with BS 1110 based at least in part on interference in communications with BS 1110. In some aspects, the request is for BS 1110 to replace a first SFI with a second SFI, so as to preempt the first SFI. The request may be a preempt indication (PI) notification or a PI-CI notification, and may be part of an intra-band or inter-band CA request. In some aspects, the request is for BS 1110 to indicate preferred SFIs or non-preferred (e.g., disallowed) SFIs. If non-preferred or disallowed SFIs are used, these SFIs may cause significant degradation in a quality of service (QoS) in CA.

UE 1120 may generate the request based at least in part on interference in communications with BS 1110. The interference may be due to movement of UE 1120 and the consequent Doppler fading, signaling clutter (local reflections, scattering, diffraction, etc.), beam blockage, or a combination thereof. UE 1120 may generate the request based at least in part on an expected QoS. For example, a higher QoS may necessitate a change in the SFI.

The preferred SFIs or non-preferred SFIs may be for two frequency bands used for CA. In some aspects, the request may be to use a first SFI for a first frequency band and to use a second SFI for a second frequency band. BS 1110 may coordinate SFIs with another base station so that self-interference is minimized.

In some aspects, BS 1110 may assist UE 1120 with SFI selection. BS 1110 may transmit one or more training symbols for UE 1120 to measure relative signal strengths. UE 1120 may select the SFI for the slot based at least in part on one or more measurements. The measurements may be based at least in part on CLI and/or self-interference. UE 1120 may report the measurements.

As shown by reference number 1135, UE 1120 may transmit the request to BS 1110. UE 1120 may transmit the request in uplink control information on a physical uplink control channel (PUCCH) or a physical uplink shared channel (PUSCH). Uplink control information can also be shared in other bands in a coexisting non-standalone system (e.g., sub-6 GHz bands, LTE bands, 3G bands, WiFi bands). In some aspects, the request is semi-static, or corresponds to the symbol or a specific set of symbols in a plurality of slots. UE 1120 may transmit the request with a CA request.

In some aspects, UE 1120 may transmit the request jointly with a request to change (e.g., overwrite or cancel) a communication mode for a particular symbol in a slot. BS 1110 may coordinate joint indications of SFI preemption and symbol communication mode changes with other base stations, TRPs, remote radio heads (RRHs) for a single UE across one or more frequency bands and/or across one or more layers, data streams, radio frequency chains, and/or ports.

As indicated above, FIG. 11 is provided as an example. Other examples may differ from what is described with respect to FIG. 11.

Figure 12:
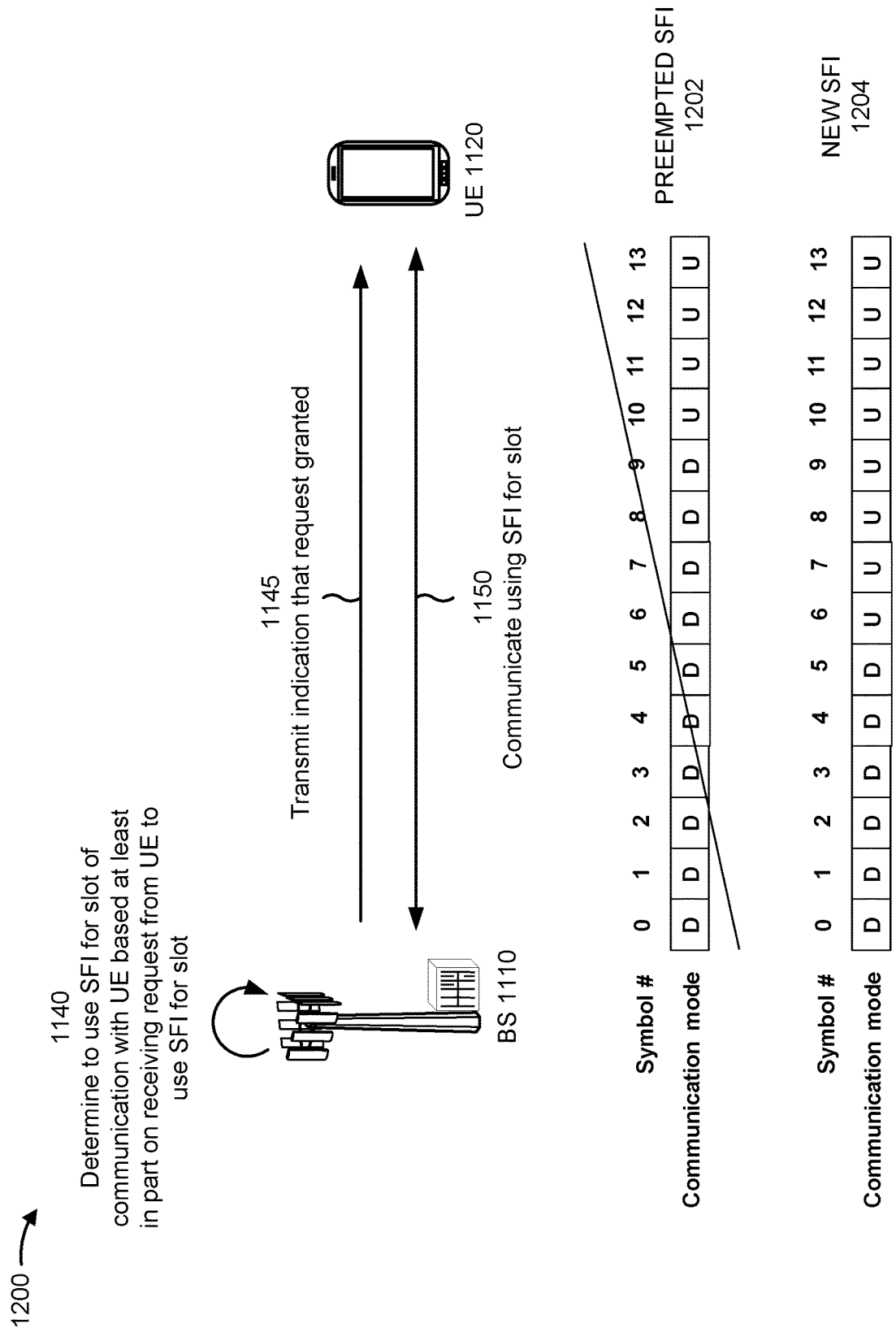

FIG. 12 is a diagram illustrating a continuation of example 1100, in accordance with the present disclosure.

As show by reference number 1140, BS 1110 may determine to use an SFI for a slot of a communication with UE 1120 based at least in part on receiving a request from UE 1120 to use the SFI for the slot. BS 1110 may grant the request from UE 1120 based at least in part on information about the interference, such as measurements of communications at the symbol or information about failed communications, increased bit or block error rates, and/or the like. BS 1110 may also consider movement of UE 1120, signaling clutter, beam blockage, or a combination thereof. BS 1110 may further consider information about other UEs affecting communications with UE 1120 and/or information from other base stations.

As shown by reference number 1145, BS 1110 may transmit an indication to UE 1120 that the request is granted. The indication may be in DCI or a MAC-CE. The indication may apply to multiple slots and/or may be in an RRC message. In some aspects, the indication may instruct UE 1120 to switch beams. Alternatively, BS 1110 may transmit an indication that the request is not granted.

As shown in FIG. 12, and by reference number 1150, UE 1120 may use the second SFI rather than the first SFI. The second SFI may be considered a new SFI 1204, and the first SFI may be considered the preempted SFI 1202. For example, preempted SFI 1202 may be slot format 32 with flexible symbols (F) 10 and 11 set to UL, and new SFI 1204 may be slot format 45 with flexible symbols 6 and 7 set to UL. As shown in FIG. 12, there is a difference between preempted SFI 1202 and new SFI 1204. New SFI 1204 may have 4 additional ULs (symbols 6-9). UE 1120 may thus transmit more uplink communications in the slot. UE 1120 may have determined that there is or was significant interference degrading downlink communications in symbols 6-9 and thus determined that symbols 6-9 should be uplink communications to make use of the symbols in the slot. As a result, communications for a slot or multiple slots may improve between BS 1110 and UE 1120.

As indicated above, FIG. 12 is provided as an example. Other examples may differ from what is described with respect to FIG. 12.

Figure 13:
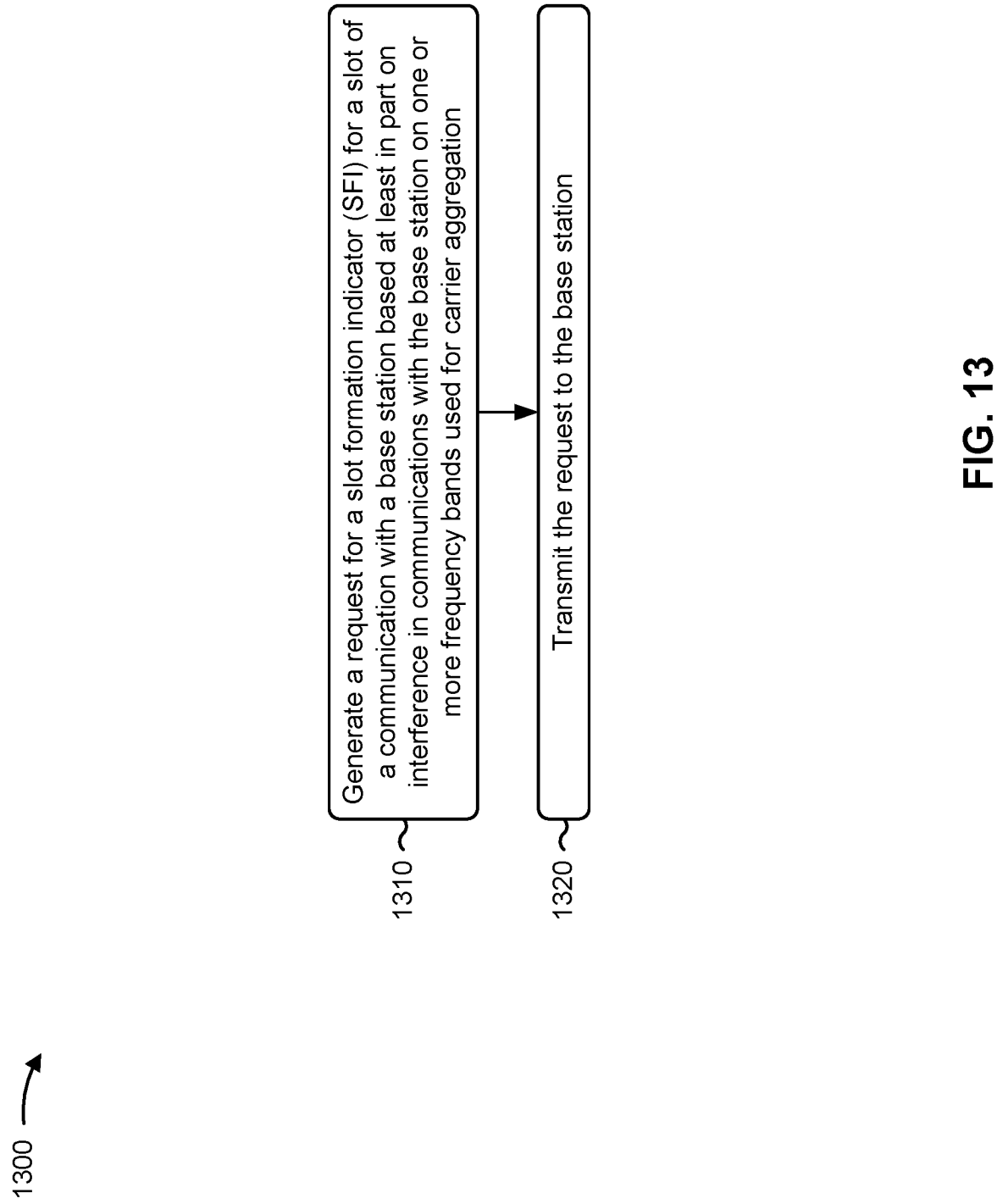
FIG. 13 is a diagram illustrating an example process performed, for example, by a UE, in accordance with of the present disclosure.

FIG. 13 is a diagram illustrating an example process 1300 performed, for example, by a UE, in accordance with the present disclosure. Example process 1300 is an example where the UE (e.g., a UE 120 depicted in FIGS. 1 and 2, the UE depicted in FIG. 6, a UE 1120 depicted in FIGS. 11 and 12) performs operations associated with SFI preemption.

As shown in FIG. 13, in some aspects, process 1300 may include generating a request for an SFI for a slot of a communication with a base station based at least in part on interference in communications with the base station on one or more frequency bands used for CA (block 1310). For example, the UE (e.g., using receive processor 258, transmit processor 264, controller/processor 280, memory 282) may generate a request for an SFI for a slot of a communication with a base station based at least in part on interference in communications with the base station on one or more frequency bands used for CA, as described above.

As further shown in FIG. 13, in some aspects, process 1300 may include transmitting the request to the base station (block 1320). For example, the UE (e.g., using receive processor 258, transmit processor 264, controller/processor 280, memory 282) may transmit the request to the base station, as described above.

Process 1300 may include additional aspects, such as any single aspect or any combination of aspects described below and/or in connection with one or more other processes described elsewhere herein.

In a first aspect, process 1300 includes receiving an indication that the request was granted, and communicating with the base station using the SFI for the slot based at least in part on receiving the indication.

In a second aspect, alone or in combination with the first aspect, the indication includes an instruction for the UE to switch beams.

In a third aspect, alone or in combination with one or more of the first and second aspects, the request is to use a first SFI for a first band of the one or more frequency bands and a second SFI for a second band of the one or more frequency bands.

In a fourth aspect, alone or in combination with one or more of the first through third aspects, generating the request includes generating the request for the SFI based at least in part on one or more of an expected quality of service, achievable data rate, achievable bit rate, or block error rate (BLER) with CA.

In a fifth aspect, alone or in combination with one or more of the first through fourth aspects, process 1300 includes receiving one or more training symbols for one or more measurements of the interference on the communications with the base station, and selecting the SFI for the slot based at least in part on the one or more measurements.

In a sixth aspect, alone or in combination with one or more of the first through fifth aspects, the request indicates one or more non-preferred SFIs for the slot.

In a seventh aspect, alone or in combination with one or more of the first through sixth aspects, transmitting the request to the base station includes transmitting the request jointly with a request to overwrite or cancel a communication mode of a symbol in the slot.

In an eighth aspect, alone or in combination with one or more of the first through seventh aspects, the interference is based at least in part on one or more of movement of the UE, signaling clutter, a cluster of beams, beam blockage, or a combination thereof.

In a ninth aspect, alone or in combination with one or more of the first through eighth aspects, transmitting the request includes transmitting the request with a CA request.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

FIG. 14 is a diagram illustrating an example process 1400 performed, for example, by a base station, in accordance with the present disclosure. Example process 1400 is an example where the base station (e.g., a BS 110 depicted in FIGS. 1 and 2, a gNB in FIGS. 5 and 6, a BS 1110 depicted in FIGS. 11 and 12) performs operations associated with slot format indicator preemption.

As shown in FIG. 14, in some aspects, process 1400 may include determining to use an SFI for a slot of a communication with a UE based at least in part on receiving a request from the UE to use the SFI for the slot (block 1410). For example, the base station (e.g., using transmit processor 220, receive processor 238, controller/processor 240, memory 242) may determine to use an SFI for a slot of a communication with a UE based at least in part on receiving a request from the UE to use the SFI for the slot, as described above.

As further shown in FIG. 14, in some aspects, process 1400 may include communicating with the UE using the SFI for the slot based at least in part on determining to use the SFI for the slot (block 1420). For example, the base station (e.g., using transmit processor 220, receive processor 238, controller/processor 240, memory 242) may communicate with the UE using the SFI for the slot based at least in part on determining to use the SFI for the slot, as described above.

Process 1400 may include additional aspects, such as any single aspect or any combination of aspects described below and/or in connection with one or more other processes described elsewhere herein.

In a first aspect, process 1400 includes transmitting an indication that the request was granted to the UE.

In a second aspect, alone or in combination with the first aspect, the indication includes an instruction to switch beams.

In a third aspect, alone or in combination with one or more of the first and second aspects, the request is to use a first SFI for a first frequency band and a second SFI for a second frequency band.

In a fourth aspect, alone or in combination with one or more of the first through third aspects, the request corresponds to one or more of an expected quality of service, achievable data rate, achievable bit rate, or BLER with CA.

In a fifth aspect, alone or in combination with one or more of the first through fourth aspects, process 1400 includes transmitting one or more training symbols to the UE for the UE to measure interference on communications with the base station.

In a sixth aspect, alone or in combination with one or more of the first through fifth aspects, the request indicates one or more non-preferred SFIs for the slot, and process 1400 includes selecting an SFI for the slot based at least in part on the one or more non-preferred SFIs.

In a seventh aspect, alone or in combination with one or more of the first through sixth aspects, receiving the request includes receiving the request jointly with a request to overwrite or cancel a communication mode of a symbol in the slot.

In an eighth aspect, alone or in combination with one or more of the first through seventh aspects, receiving the request includes receiving the request with a CA request.

In a ninth aspect, alone or in combination with one or more of the first through eighth aspects, determining to use the SFI includes determining to use the SFI based at least in part on slot information from one of another base station, a TRP, or an RRH.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: generating a request to overwrite or cancel a communication mode of a symbol in a slot of a communication with a base station based at least in part on interference in communications with the base station on one or more frequency bands used for carrier aggregation; and transmitting the request to the base station.

Aspect 2: The method of Aspect 1, further comprising: receiving an indication that the request was granted; and communicating with the base station using another communication mode for the symbol in the slot based at least in part on receiving the indication.

Aspect 3: The method of Aspect 1 or 2, wherein the communication mode is an uplink communication mode, and wherein the request is to overwrite the uplink communication mode of the symbol with a downlink communication mode.

Aspect 4: The method of Aspect 1 or 2, wherein the request is for the base station to prioritize a downlink communication mode over an uplink communication mode for the symbol.

Aspect 5: The method of Aspect 1 or 2, wherein the communication mode is a downlink communication mode, and wherein the request is to overwrite the downlink communication mode of the symbol with an uplink communication mode.

Aspect 6: The method of Aspect 1 or 2, wherein the request is for the base station to prioritize an uplink communication mode over a downlink communication mode for the symbol.

Aspect 7: The method of Aspect 1 or 2, wherein the request is to cancel the communication mode of the symbol such that the symbol becomes a gap or a flexible symbol.

Aspect 8: The method of any of Aspects 1-7, wherein the request corresponds to the symbol in a plurality of slots.

Aspect 9: The method of any of Aspects 1-8, wherein the interference is based at least in part on one or more of movement of the UE associated with Doppler fading, clutter in a channel environment, beam blockage, or a combination thereof.

Aspect 10: The method of any of Aspects 1-9, wherein transmitting the request includes transmitting the request in uplink control information on a physical uplink channel for the slot.

Aspect 11: A method of wireless communication performed by a base station, comprising: determining to overwrite or cancel a communication mode of a symbol in a slot of a communication with a user equipment (UE) based at least in part on receiving a request from the UE to overwrite or cancel the communication mode of the symbol; and communicating with the UE to use another communication mode for the symbol in the slot based at least in part on determining to overwrite or cancel the communication mode of the symbol.

Aspect 12: The method of Aspect 11, further comprising transmitting an indication that the request was granted to the UE.

Aspect 13: The method of Aspect 12, wherein the communication mode is an uplink communication mode, and wherein the indication is to overwrite the uplink communication mode of the symbol with a downlink communication mode.

Aspect 14: The method of Aspect 12, wherein the communication mode is a downlink communication mode, and wherein the indication is to overwrite the downlink communication mode of the symbol with an uplink communication mode.

Aspect 15: The method of Aspect 11 or 12, wherein the request from the UE is for the base station to prioritize a downlink communication mode over an uplink communication mode for the symbol.

Aspect 16: The method of Aspect 11 or 12, wherein the request from the UE is for the base station to prioritize an uplink communication mode over a downlink communication mode for the symbol.

Aspect 17: The method of Aspect 11 or 12, wherein the request is to cancel the communication mode of the symbol such that the symbol become a gap symbol or a flexible symbol.

Aspect 18: The method of any of Aspects 11-17, wherein the request corresponds to the symbol in a plurality of slots.

Aspect 19: The method of any of Aspects 11-18, wherein determining to overwrite or cancel the communication mode of the symbol includes determining to overwrite or cancel the communication mode of the symbol based at least in part on movement of the UE, clutter detected by the UE, beam blockage, or a combination thereof.

Aspect 20: The method of any of Aspects 11-19, wherein receiving the request includes receiving the request in uplink control information on a physical uplink channel for the slot.

Aspect 21: The method of any of Aspects 11-20, further comprising performing one or more of rate control or modulation and coding scheme adaptation based at least in part on the request.

Aspect 22: A method of wireless communication performed by a user equipment (UE), comprising: generating a request for a slot format indicator (SFI) for a slot of a communication with a base station based at least in part on interference in communications with the base station on one or more frequency bands used for carrier aggregation; and transmitting the request to the base station.

Aspect 23: The method of Aspect 22, further comprising: receiving an indication that the request was granted; and communicating with the base station using the SFI for the slot based at least in part on receiving the indication.

Aspect 24: The method of Aspect 22 or 23, wherein the indication includes an instruction for the UE to switch beams.

Aspect 25: The method of any of Aspects 22-24, wherein the request is to use a first SFI for a first band of the one or more frequency bands and a second SFI for a second band of the one or more frequency bands.

Aspect 26: The method of any of Aspects 22-25, wherein generating the request includes generating the request for the SFI based at least in part on one or more of an expected quality of service, achievable data rate, achievable bit rate, or block error rate with carrier aggregation.

Aspect 27: The method of any of Aspects 22-26, further comprising: receiving one or more training symbols for one or more measurements of the interference on the communications with the base station; and selecting the SFI for the slot based at least in part on the one or more measurements.

Aspect 28: The method of any of Aspects 22-27, wherein the request indicates one or more non-preferred SFIs for the slot.

Aspect 29: The method of any of Aspects 22-28, wherein transmitting the request to the base station includes transmitting the request jointly with a request to overwrite or cancel a communication mode of a symbol in the slot.

Aspect 30: The method of any of Aspects 22-29, wherein the interference is based at least in part on one or more of movement of the UE or Doppler fading, clutter in the channel environment, beam blockage, or a combination thereof.

Aspect 31: The method of any of Aspects 22-30, wherein transmitting the request includes transmitting the request with a carrier aggregation request.

Aspect 32: A method of wireless communication performed by a base station, comprising: determining to use a slot format indicator (SFI) for a slot of a communication with a user equipment (UE) based at least in part on receiving a request from the UE to use the SFI for the slot; and communicating with the UE using the SFI for the slot based at least in part on determining to use the SFI for the slot.

Aspect 33: The method of Aspect 32, further comprising transmitting an indication that the request was granted to the UE.

Aspect 34: The method of Aspect 32 or 33, wherein the indication includes an instruction to switch beams.

Aspect 35: The method of any of Aspects 32-34, wherein the request is to use a first SFI for a first frequency band and a second SFI for a second frequency band.

Aspect 36: The method of any of Aspects 32-34, wherein the request corresponds to one or more of an expected quality of service, achievable data rate, achievable bit rate, or block error rate with carrier aggregation.

Aspect 37: The method of any of Aspects 32-36, further comprising transmitting one or more training symbols to the UE for the UE to measure interference on communications with the base station.

Aspect 38: The method of any of Aspects 32-37, wherein the request indicates one or more non-preferred SFIs for the slot, and wherein the method further comprises selecting an SFI for the slot based at least in part on the one or more non-preferred SFIs.

Aspect 39: The method of any of Aspects 32-38, wherein receiving the request includes receiving the request jointly with a request to overwrite or cancel a communication mode of a symbol in the slot.

Aspect 40: The method of any of Aspects 32-39, wherein receiving the request includes receiving the request with a carrier aggregation request.

Aspect 41: The method of any of Aspects 32-40, wherein determining to use the SFI includes determining to use the SFI based at least in part on slot information from one of another base station, a transmission reception point, or a remote radio head.

Aspect 42: An apparatus for wireless communication at a device, comprising a processor; memory coupled with the processor; and instructions stored in the memory and executable by the processor to cause the apparatus to perform the method of one or more Aspects of Aspects 1-41.

Aspect 43: A device for wireless communication, comprising a memory and one or more processors coupled to the memory, the memory and the one or more processors configured to perform the method of one or more Aspects of Aspects 1-41.

Aspect 44: An apparatus for wireless communication, comprising at least one means for performing the method of one or more Aspects of Aspects 1-41.

Aspect 45: A non-transitory computer-readable medium storing code for wireless communication, the code comprising instructions executable by a processor to perform the method of one or more Aspects of Aspects 1-41.

Aspect 46: A non-transitory computer-readable medium storing a set of instructions for wireless communication, the set of instructions comprising one or more instructions that, when executed by one or more processors of a device, cause the device to perform the method of one or more Aspects of Aspects 1-41.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more processors configured to:
      generate a request to overwrite or cancel a communication mode of a symbol in a slot of a communication with a base station such that the symbol becomes a gap symbol or a flexible symbol based at least in part on interference in communications with the base station on one or more frequency bands used for carrier aggregation; and
      transmit the request to the base station.

2. The UE of claim 1, wherein the one or more processors are further configured to:
   receive an indication that the request was granted; and
   communicate with the base station using another communication mode for the symbol in the slot based at least in part on receiving the indication.

3. The UE of claim 1, wherein the communication mode is an uplink communication mode, and wherein the request is to overwrite the uplink communication mode of the symbol with a downlink communication mode.

4. The UE of claim 1, wherein the request is for the base station to prioritize a downlink communication mode over an uplink communication mode for the symbol.

5. The UE of claim 1, wherein the communication mode is a downlink communication mode, and wherein the request is to overwrite the downlink communication mode of the symbol with an uplink communication mode.

6. The UE of claim 1, wherein the request is for the base station to prioritize an uplink communication mode over a downlink communication mode for the symbol.

7. The UE of claim 1, wherein the request corresponds to the symbol in a plurality of slots.

8. The UE of claim 1, wherein the interference is based at least in part on one or more of movement of the UE associated with Doppler fading, clutter in a channel environment, beam blockage, or a combination thereof.

9. The UE of claim 1, wherein the one or more processors, when transmitting the request, are configured to:
   transmit the request in uplink control information on a physical uplink channel for the slot.

10. A base station for wireless communication, comprising:
    one or more memories; and
    one or more processors coupled to the one or more memories, the one or more processors configured to:
       determine to overwrite or cancel a communication mode of a symbol in a slot of a communication with a user equipment (UE) such that the symbol becomes a gap symbol or a flexible symbol based at least in part on receiving a request from the UE to overwrite or cancel the communication mode of the symbol; and
       communicate with the UE using another communication mode for the symbol in the slot based at least in part on determining to overwrite or cancel the communication mode of the symbol.

11. The base station of claim 10, wherein the one or more processors are further configured to:
    transmit an indication that the request was granted to the UE.

12. The base station of claim 11, wherein the communication mode is an uplink communication mode, and wherein the indication is to overwrite the uplink communication mode of the symbol with a downlink communication mode.

13. The base station of claim 11, wherein the communication mode is a downlink communication mode, and wherein the indication is to overwrite the downlink communication mode of the symbol with an uplink communication mode.

14. The base station of claim 10, wherein the request from the UE is for the base station to prioritize a downlink communication mode over an uplink communication mode for the symbol.

15. The base station of claim 10, wherein the request from the UE is for the base station to prioritize an uplink communication mode over a downlink communication mode for the symbol.

16. The base station of claim 10, wherein the request is to cancel the communication mode of the symbol such that the symbol becomes a gap symbol or a flexible symbol.

17. The base station of claim 10, wherein the request corresponds to the symbol in a plurality of slots.

18. The base station of claim 10, wherein the one or more processors, when determining to overwrite or cancel the communication mode of the symbol, are configured to:
  determine to overwrite or cancel the communication mode of the symbol based at least in part on movement of the UE, clutter detected by the UE, beam blockage, or a combination thereof.

19. The base station of claim 10, wherein the one or more processors, when receiving the request, are configured to:
  receive the request in uplink control information on a physical uplink channel for the slot.

20. A method of wireless communication performed by a user equipment (UE), comprising:
  generating a request to overwrite or cancel a communication mode of a symbol in a slot of a communication with a base station such that the symbol becomes a gap symbol or a flexible symbol based at least in part on interference in communications with the base station on one or more frequency bands used for carrier aggregation; and
  transmitting the request to the base station.

21. The method of claim 20, further comprising:
  receiving an indication that the request was granted; and
  communicating with the base station using another communication mode for the symbol in the slot based at least in part on receiving the indication.

22. The method of claim 20, wherein the communication mode is an uplink communication mode, and wherein the request is to overwrite the uplink communication mode of the symbol with a downlink communication mode.

23. The method of claim 20, wherein the request is for the base station to prioritize a downlink communication mode over an uplink communication mode for the symbol.

24. The method of claim 20, wherein the communication mode is a downlink communication mode, and wherein the request is to overwrite the downlink communication mode of the symbol with an uplink communication mode.

25. The method of claim 20, wherein the request is for the base station to prioritize an uplink communication mode over a downlink communication mode for the symbol.

26. A method of wireless communication performed by a base station, comprising:
  determining to overwrite or cancel a communication mode of a symbol in a slot of a communication with a user equipment (UE) such that the symbol becomes a gap symbol or a flexible symbol based at least in part on receiving a request from the UE to overwrite or cancel the communication mode of the symbol; and
  communicating with the UE to use another communication mode for the symbol in the slot based at least in part on determining to overwrite or cancel the communication mode of the symbol.

27. The method of claim 26, further comprising transmitting an indication that the request was granted to the UE.

28. The method of claim 27, the communication mode is a downlink communication mode, and wherein the indication is to overwrite the downlink communication mode of the symbol with an uplink communication mode.

29. The method of claim 27, the communication mode is an uplink communication mode, and wherein the indication is to overwrite the uplink communication mode of the symbol with a downlink communication mode.

30. The method of claim 26, wherein the request corresponds to the symbol in a plurality of slots.

* * * * *